April 6, 1948.  W. WATERMAN  2,439,117
AUTOMATIC CUTOFF
Filed April 11, 1942

Inventor:
William Waterman
By: Roland C. Rehm
Atty

Patented Apr. 6, 1948

2,439,117

UNITED STATES PATENT OFFICE 2,439,117

AUTOMATIC CUTOFF

William Waterman, Chicago, Ill.

Application April 11, 1942, Serial No. 438,565

10 Claims. (Cl. 137—152)

This invention relates to an automatic cut-off, or valve, for preventing excess flow and among other objects aims to provide a device of this character in which there is an improved compensation for the effects of varied fluid viscosity.

The nature of the invention may be readily understood by reference to an illustrative device embodying the invention and shown in the accompanying drawing.

Figure 1:
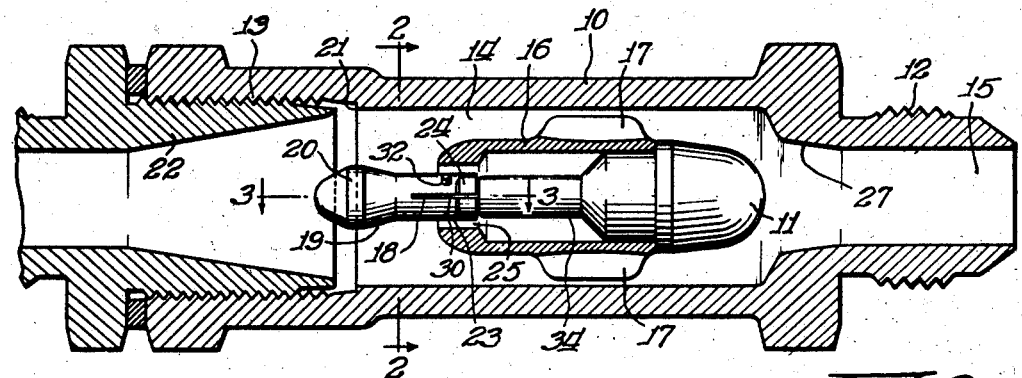
Fig. 1 is a longitudinal section of the device adapted to be installed in a fluid line.

As explained fully in my aforesaid co-pending application, devices of this character are useful to cut off flow in fluid lines which have been broken or punctured, and are particularly useful for aircraft where a line may be broken by vibration or gun fire. The device is not limited, of course, in its utility to aircraft or to lines carrying liquids. For example, it may be used to close gas lines which have been broken by bombing, corrosion, or by any other cause. Operation of the device to close a line depends upon the development of forces which cannot be exerted either by gravity, vibration, or inertia regardless of their direction and including the high inertia forces (as high as seven times gravity) sometimes developed in aircraft on power dives, etc. By inertia forces is meant, of course, the forces of acceleration and deceleration.

In the present device the excess energy and velocity of moving fluid such as oil or fuel (represented by flow in excess of the normal or maximum ordinary flow) caused by a break in the line, is utilized to exert an operating force which cannot be developed to a material degree as a component of either inertia, gravity, or vibration. Such operating force is independent of pressure, depending mainly upon an excess rate of flow which results immediately and directly from breakage of a line.

As here shown, the forces comprising the aforesaid excess flow are utilized to develop a rotational force which operates the device to close the line. The present device is particularly adapted for use where there is a wide variation in the viscosities of the fluid traveling through the line. In aircraft, and particularly military aircraft, which travel at high altitudes, the low temperatures encountered very greatly increase the viscosity of fluids over what it is at ordinary temperatures. This causes a wide variation in the frictional and related forces set up by the travel of fluid through the cut-off valve and its operating elements. If the device be designed to operate, that is to close, upon a predetermined excess flow and independently of variation in viscosity of the fluid, compensation for variation in viscosity may be necessary. For ordinary temperature variations such compensation is relatively less important and may not require compensation, but where, as in the case of aircraft, temperatures from 150° F. to —40° F. may be encountered, there is an excessive variation in viscosity and resulting frictional forces which require compensation. For example, in aircraft where hydraulic fluid is used to operate landing gear, wing and tail flaps, gun turrets, etc., there is a variation in viscosity from about 50 S. S. V. at 150° F. to about 25,000 S. S. V. at —40° F. Unless there be compensation for this wide variation in viscosity, obviously the cut-off valve will operate at widely varying rates of flow, depending on viscosity.

In the illustrative device the increased valve operating forces (due to increase in viscosity) are balanced or counteracted by correspondingly increasing the resistance to operation of the valve.

Many of the details of the illustrative device are similar to those shown in my co-pending application and a brief description thereof will, therefore, suffice. The housing 10 containing the valve 11 is provided with standard external and internal threads 12 and 13 by means of which it may be connected in a fluid line. The diameter of the interior 14 of the housing is enlarged as compared to the passages 15 representing the cross section of the line so as to provide space for the valve 11 without substantially reducing the effective cross section of the line. Valve 11 is mounted on a valve carrier 16 provided with means in the form of inclined or spiral vanes 17 lying in the path of the traveling fluid for subjecting the valve to forces generally corresponding to the rate of fluid flow. When a predetermined rotating force is exerted on the valve carrier by action of the flowing fluid on the vanes, the carrier is released to permit the valve to close.

The means for releasably holding the valve is here shown in the form of a transverse member 18 which may either be flexed or broken upon exertion of a predetermined force to release the valve. The valve is held in open position by an anchor 19 having transversely extending wings 20 (made narrow so as not materially to obstruct the fluid passage) by means of which the anchor is mounted inside the interior 14 of the housing. In the present case the wings 20 abut shoulder 21 in the housing against which they are held by the connecting fitting or plug 22. The free extremity 23 of the anchor is provided with an enlarged head 24 which enters the hollow interior 25 of the rear end of the valve carrier and engages a shoulder 26 inside the carrier by means of which the valve and its carrier are held in open position or against movement toward the valve seat 27. The shape of the opening into the rear end of the valve carrier corresponds to that of the head 24 on the anchor to permit release of the valve when the latter has been rotated to a predetermined position relative to the anchor to clear the shoulder 26. In the present instance the head 24 is formed by a pair of sector shaped lugs 28 and the opening in the carrier includes a pair of correspondingly shaped recesses 29 which allow the valve carrier to withdraw from the anchor when the relative rotation registers lugs 28 with recesses 29.

Valve 11 and its seat 27 are correspondingly tapered and preferably this taper is relatively small (7° in the present instance) so that when closed the valve will be tightly wedged in its seat so that it cannot be displaced by inertia or vibration. If desired, the valve 11 may be made of softer material, like a plastic, which will conform with the seat without the necessity of a lapping operation.

The releasable holding element 18 is seated in a transverse slot 30 in the shank of the anchor and its ends are engaged by lugs 31 depending from the valve carrier 16 by means of which effective rotation of the valve carrier is prevented until a predetermined force has been exerted on the valve. If the releasing member be a spring, release of the valve is prevented until the spring has been flexed sufficiently either to bring the head 24 of the anchor in register with the recess 29 in the valve carrier or until the lugs 31 clear the ends of the spring. (See Figs. 2, 3 and 4.) If the element 18 release by fracture, the valve is held against rotation until a force sufficient to fracture the element is exerted. In the present instance rotation of the valve carrier 16 through an angle of about 85° relative to the anchor is required before the valve is released from the anchor.

Reverse rotation of valve carrier 16 due to flow of fluid in the reverse direction is prevented by means of a pin 32 projecting from the shank of the anchor and engaging the valve carrier. This prevents rotation of the valve carrier by travel of fluid through the line in the reverse direction. In the present case, as shown particularly in Fig. 2, the ends of pin 32 abut the ends 33 of the sector shaped openings 29 in the carrier, preventing it from rotating in a reverse direction. The pin does not, however, prevent the necessary rotation of the carrier in the opposite direction. By the time the opposite ends of the sector shaped openings reach the pin, the carrier will have rotated far enough to register opening 29 with the sector shaped lugs 28 on the anchor, thereby allowing the valve carrier to slide forwardly off the anchor to close position. Valve 11 is provided with a projection 34 extending rearwardly into close proximity with the end 23 of the anchor. On reverse flow of fluid projection 34 engages the end of the anchor thereby to relieve spring 18 of the load, which would otherwise be imposed on it.

By elongating lugs 31 and anchor head 24 so that the valve on release merely slides on the anchor head to closed position, it is possible to reset the valve merely by reversing the flow in the line. In that case spring 18 should be designed to permit alignment of openings 29 with lugs 28 merely by flexure and not by slipping off lugs 31.

Figure 2:
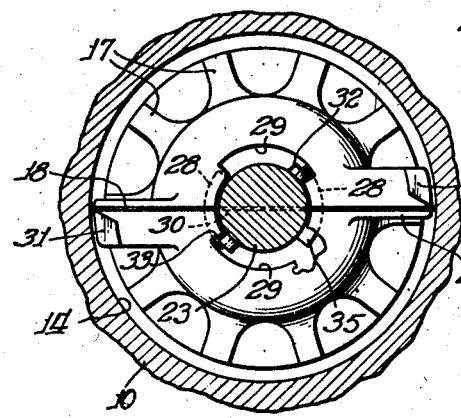
Fig. 2 is a transverse section taken on the plane 2—2 of Fig. 1.
Figure 3:
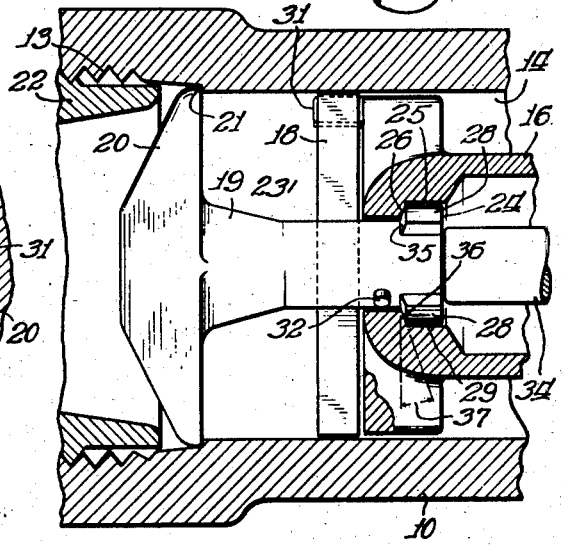
Fig. 3 is a fragmentary longitudinal section on an enlarged scale, of details of the device.

Fig. 2 shows the valve carrier in unstrained position, that is, when the rate of flow is insufficient substantially to flex spring 18. As the flow increases the valve carrier rotates in a clockwise direction (as viewed from Fig. 2), thereby flexing the spring. When the maximum normal flow is exceeded the valve carrier will be rotated so far that the ends of the spring slip past the depending lugs 31 on the carrier. By this time the openings 29 in the carrier will come into registry with the lugs 28 on the anchor, allowing the carrier to move forwardly toward closed position. It is not necessary that rotation carry the lugs 31 beyond the ends of the spring; the valve carrier will be released in any event when the openings 29 register with the anchor head whether or not the lugs have cleared the spring. Rotation beyond this point of registry is prevented by engagement of pin 32 with the opposite ends of openings 28. Similar operation will occur if, instead of a spring, the element 18 comprise a frangible material which breaks when a predetermined rotating force is exceeded. In that event, upon breakage of this element the valve carrier rotates to the aforesaid position of registry and thereupon slides forwardly off the anchor to closed position.

Experience has shown that momentary surges in the line caused by admission of high pressure to a low pressure line do not result in release of the valve to closed position. Such surges occur because oil is compressible to a slight degree and because tubing, etc., is elastic and increases in diameter when under pressure.

The rotating force on the valve carrier increases not only with increase in rate of flow but also with increase in viscosity of the fluid. On the other hand the increase in friction of the fluid with the surfaces of the vanes sets up a component of frictional drag which partially resists rotation. This frictional drag increases with increase in viscosity of the fluid. The forces tending to rotate the valve depend also upon the angle of inclination of the vanes or flutes, on the cross sectional area of flutes, and on the proportion of the passage occupied by the flutes. The greater the clearance between the flutes and the housing, the greater the proportion of fluid passing beyond the flutes and the less the rotational force exerted. The rotating force also varies with the effective radius of the flutes.

Resistance to rotation of the valve also varies with the character of the contacting surfaces between the valve carrier and its anchor. In the construction illustrated in Fig. 1 such contacting surfaces comprise the surface under the lugs 28 and the surface of shoulders against which lugs 28 are seated. In the construction illustrated in Fig. 1, such contacting surfaces comprise the surface 35 under head 24, and surface 36 of shoulder 26. As the viscosity of the fluid increased, the increase pressure between these contacting surfaces correspondingly increases the resistance to rotation of the valve and its carrier. By changing the angle of inclination of the contacting surfaces relative to the direction of flow (in this case relative to the axis of the valve carrier), the resistance to rotation may be varied. This resistance varies inversely as the cosine of angle 37, being the angle of inclination relative to a plane transverse to the axis of the carrier. For example, if such angle were 60° (its cosine being ½) the resistance to rotation would be double what it would be if the angle were zero (cosine equals 1). The cosine of small angles very nearly approximates 1; small angles of inclination, therefore, have little effect in increasing resistance though as here shown an inclined surface regardless of the degree of inclination serves to center the valve carrier relative to the anchor.

Thus, by varying the angle of inclination of the contacting surfaces, the resistance to rotation of the valve and its carrier may be adjusted to compensate to any desired degree for the increase in rotational force due to increase in viscosity.

The net turning force on the valve and its carrier is, therefore, the difference between the gross turning force and the gross forces resisting or opposing rotation. By adjusting the angle of inclination of the flutes, 17, the clearance beyond the flutes, the degree of streamlining of the carrier and the fluid passages, and the aforesaid angle of inclination of surfaces 35 and 36, the net turning force may be controlled and may be made substantially constant for all viscosities of oil or other fluid. In other words, operation of the device may be made substantially independent of variations in viscosity. The amount of clearance between the ends of flutes 17 and the wall of the housing obviously is important in determining the net turning force on the valve carrier, as also is the shape of the unobstructed area for oil flow. The same applies also to the degree of streamlining, or lack of streamlining, of the valve carrier since that determines the amount of energy wasted in flow past the carrier.

Figure 4:
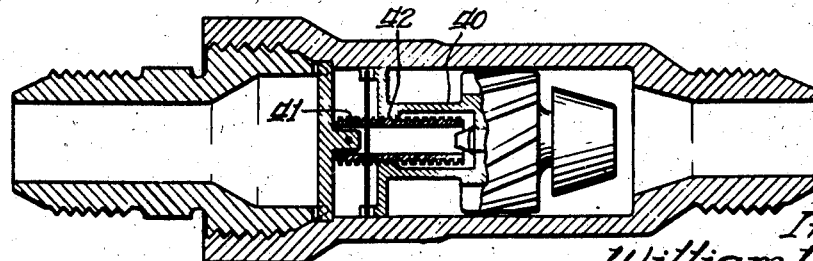
Fig. 4 is a longitudinal section of a device similar to that shown in my co-pending application, Serial No. 425,427.

In the form of device illustrated in my co-pending application and herein diagrammatically illustrated in Fig. 4 the contacting surfaces between the valve carrier 40, and its anchor 41, are represented by the contacting thread surfaces 42. By adjusting the thread pitch the resistance to rotation offered by the pressure on the thread surfaces may be varied to compensate for variations in fluid viscosity. The thread surfaces offer resistance to rotation in varying degrees until the tangent of the angle of inclination of the thread equals the coefficient of friction between the surfaces. When the tangent of the angle of inclination is greater than the coefficient of friction there will be a negative resistance, that is, the threads will actually assist in the rotation of the valve carrier.

It should be understood that with the normally high oil pressures used and at high viscosities the forces exerted by the fluid, both in resisting and promoting rotation of the the valve carrier, are very substantial; and there may, therefore, be a wide variation in the net rotating force. This makes it necessary to adjust the design to bring and maintain these forces in the proper relation.

Obviously, the invention is not limited to the details of the illustrative devices, since these may be variously modified. Moreover, it is not indispensible that all features of the invention be used conjointly, since various features may be used to advantage in different combinations and special combinations.

Having described my invention, I claim:

1. A cut off device for automatically closing a fluid line upon predetermined excess flow of fluid therein comprising in combination a valve, a housing therefor adapted to be placed in a fluid line, said valve having flutes projecting therefrom and inclined relative to the direction of fluid flow to develop valve rotating forces under the action of flowing fluid, said valve being rotatable under normal fluid flow but being provided with positive means for holding the valve open and releasable upon a predetermined rotation of the valve to permit the latter to close, and a device for preventing such predetermined rotation under forces exerted by normal fluid flow but permitting such predetermined rotation under excess rotational forces.

2. A cut off device for fluid lines and the like comprising in combination a valve housing adapted to be placed in a fluid line and having a valve seat, a valve in said housing normally positioned in spaced relation to the seat and arranged to move toward said seat in response to fluid flow, and means for releasably holding the valve in such spaced rotation to said seat comprising shoulders carried by the valve and fixed against axial movement in the housing, respectively, cooperating when engaged to hold the valve in normal position against inertia forces and other forces due to flow less than a predetermined rate, and means adapted to be progressively stressed by flowing fluid and to release said shoulders from engagement with each other in response to a predetermined rate of flow.

3. A cut off device for fluid lines and the like comprising in combination a valve housing adapted to be placed in a line, a valve in said fluid line movable by the flowing fluid to close the line and having surfaces engaged by the flowing fluid to rotate the valve, means for resisting substantial rotation of said valve under normal flow conditions and constructed and arranged to permit predetermined rotation of said valve upon excessive flow, an anchor device in said housing having friction surfaces engaging said valve to hold the valve open, said anchor being adapted to release said valve for closing upon predetermined rotation thereof, said friction surfaces being inclined to increase the resistance thereof to rotation of said valve substantially to balance out increase in the valve rotating forces of said fluid due to increase in viscosity thereof.

4. A cut off device comprising in combination a valve housing adapted to be placed in a fluid line, a normally open valve in said housing rotatable by the flowing fluid and movable by the fluid to close said line, mechanism for holding the valve open against the force of the normal fluid flow and operating upon rotation of the valve by excess fluid flow to release said valve, and means for increasing with increase in fluid viscosity resistance to said rotation of said valve substantially to balance out the increased valve rotating forces due to increase in viscosity of the flowing fluid.

5. A cut off device for automatically closing a fluid line upon a predetermined excess flow of fluid therein comprising in combination a normally open valve having surfaces exposed to the friction of the flowing fluid and acted on thereby to close the valve, means for holding the valve open against the forces exerted on said surfaces by normal fluid flow, said forces increasing with increase in fluid viscosity, said means being releasable upon the exertion of forces on said valve surfaces exceeding the force exerted by normal fluid flow, and means for increasing the resistance to release of said valve substantially to balance out increased valve closing forces of said fluid due to increase in viscosity of said fluid.

6. A cut off device for automatically closing a fluid line upon a predetermined excess flow of fluid therein comprising in combination a normally open valve having surfaces acted on by the friction of the flowing fluid so as to tend to close the valve, means for holding the valve open against the friction forces exerted by normal fluid flow and releasable under forces in excess of those exerted by normal fluid flow, said forces increasing with increase in fluid viscosity, said means including relatively movable friction surfaces subjected to varying forces depending upon the viscosity of the fluid, said surfaces being inclined relative to the direction of fluid travel to increase the friction thereof substantially to balance out increased valve-closing forces exerted on said valve by the flowing fluid due to increase in fluid viscosity.

7. A cut off device for automatically closing a fluid line comprising in combination a valve housing adapted to be placed in a fluid line, a valve in said housing acted on by the flowing fluid to close said line, said valve having surfaces acted upon by the friction of the flowing fluid to rotate the valve to release it for closing, the friction on said surfaces increasing with increase in fluid viscosity, an anchor device in said housing, means for interconnecting the valve with said anchor device to hold the valve open against the forces exerted by the flowing fluid and inclined to increase frictional resistance to valve rotation with increase in the viscosity of the fluid to compensate for increase in valve releasing forces exerted on said valve with increased fluid viscosity.

8. A cut off device for automatically closing a fluid line upon predetermined excess flow of fluid therein comprising in combination a rotatable valve, a housing therefor adapted to be placed in the fluid line, said valve having surfaces acted on by the flowing fluid and arranged to rotate the valve, an anchor device in said housing, means connecting the valve to said anchor device to hold the valve open and releasable on predetermined rotation of the valve, said means including a device resisting rotation of said valve under the forces exerted by normal fluid flow and yieldable under forces exerted on said valve by excess fluid flow sufficiently for said predetermined rotation thereby to release said valve.

9. A fluid operated latch for controlling movement of an element in response to the rate of flow of fluid in a line comprising a shoulder fixed relatively to the direction of fluid flow and a shoulder carried by the element and normally engaged with the first shoulder to hold the element positively against movement in the direction of fluid flow and disengageable from the first shoulder to release the element upon the element rotating through a predetermined angle, means causing the element to rotate in response to fluid flow in excess of a predetermined rate, and means adapted to become progressively stressed by rotation of the element.

10. An automatic cut-off device comprising in combination a valve housing forming a passage for fluid, a valve in said passage and movable in the direction of fluid flow to close said passage, said valve presenting surfaces to the fluid against which the latter acts to create valve rotating forces, a torsion spring resisting rotation of said valve, means normally holding the valve against closing movement but operative on predetermined rotation of said valve for releasing the latter to close.

WILLIAM WATERMAN.

REFERENCES CITED

The following references are of record in the file of this patent:

UNITED STATES PATENTS

| Number | Name | Date |
| --- | --- | --- |
| 524,393 | Neely | Aug. 14, 1894 |
| 2,093,015 | Madden | Sept. 14, 1937 |
| 2,127,849 | Stone | Aug. 23, 1938 |
| 2,139,050 | Vickers | Dec. 6, 1938 |

FOREIGN PATENTS

| Number | Country | Date |
| --- | --- | --- |
| 107,434 | Great Britain | 1917 |